(12) United States Patent
Korrub

(10) Patent No.: US 10,135,762 B2
(45) Date of Patent: Nov. 20, 2018

(54) BIDIRECTIONAL GROUP TEXT MESSAGING SYSTEM AND METHOD

(71) Applicant: Geoffrey E Korrub, Austin, TX (US)

(72) Inventor: Geoffrey E Korrub, Austin, TX (US)

( * ) Notice: Subject to any disclaimer, the term of this patent is extended or adjusted under 35 U.S.C. 154(b) by 429 days.

(21) Appl. No.: 14/799,246

(22) Filed: Jul. 14, 2015

(65) Prior Publication Data

US 2017/0019355 A1   Jan. 19, 2017

(51) Int. Cl.
*H04L 12/58* (2006.01)
*H04L 29/08* (2006.01)
*H04W 4/14* (2009.01)

(52) U.S. Cl.
CPC ............ *H04L 51/043* (2013.01); *H04L 51/14* (2013.01); *H04L 51/28* (2013.01); *H04L 67/1044* (2013.01); *H04W 4/14* (2013.01)

(58) Field of Classification Search
CPC ....... H04L 51/043; H04L 51/14; H04L 51/28; H04L 67/1044; H04W 4/14
See application file for complete search history.

(56) References Cited

U.S. PATENT DOCUMENTS

| | | | | |
|---|---|---|---|---|
| 7,940,704 B2 * | 5/2011 | Lin | .................. | H04L 51/04 370/260 |
| 2002/0138605 A1 * | 9/2002 | Hole | ...................... | H04L 43/00 709/224 |
| 2002/0173319 A1 * | 11/2002 | Fostick | ............... | H04W 88/184 455/466 |
| 2007/0238076 A1 * | 10/2007 | Burstein | .................. | G09B 7/00 434/156 |
| 2008/0132215 A1 * | 6/2008 | Soderstrom | ......... | H04L 12/1818 455/416 |
| 2009/0061825 A1 * | 3/2009 | Neelakantan | ..... | H04L 29/12292 455/412.1 |
| 2009/0149167 A1 * | 6/2009 | Patel | ....................... | H04W 4/06 455/416 |
| 2009/0150668 A1 * | 6/2009 | Liu | ....................... | H04L 9/0833 713/163 |
| 2009/0157798 A1 * | 6/2009 | Laumen | ................ | H04W 84/08 709/203 |
| 2009/0204673 A1 * | 8/2009 | Tian | .................... | H04L 12/1822 709/204 |
| 2011/0045851 A1 * | 2/2011 | Maddox | .................. | H04W 4/06 455/466 |
| 2011/0281569 A1 * | 11/2011 | Cohen | .................... | H04L 12/189 455/416 |
| 2012/0039450 A1 * | 2/2012 | Labuda | .................. | H04M 15/43 379/114.03 |

* cited by examiner

*Primary Examiner* — Larry Donaghue

(57) ABSTRACT

A bidirectional group text messaging system is disclosed having a group owner that initiates a group by obtaining a provisioned telephone number, the group owner establishes a list of group members using identifying information for each group member, text messages from any group member are sent to the provisioned telephone number and from that provisioned telephone number sent to each group member, wherein the group members' identifying information is not available to any other group member except the group owner. The group owner may add and delete members at any time. Further, a text message sourced from a group member may be prevented from being sent to the sourcing member. In addition, a billing member can create logic sets to calculate a value prior to the message being transmitted to each group member.

16 Claims, 4 Drawing Sheets

BIDIRECTIONAL GROUP TEXT MESSAGING SYSTEM AND METHOD

BACKGROUND OF THE INVENTION

Field of the Invention

The present invention refers in general to the field of text messaging, and more particularly, to a bidirectional group text messaging system and method.

Description of Related Art

Group text messaging generally falls into one of two types. The first is when one user sends the same text message to more than one recipient at the same time. The group then consists of all the recipients and the initial sender. Any recipient can then respond to that message and send their response to the group. Entering and leaving a messaging group using common SMS protocols and tools is an inconsistent and at times challenging or even impossible endeavor depending on the phone type being used. In addition, all members of the group are only informed of new members or reduced members by an update in the 'to' field that may be a large list of individuals that is difficult to track. When utilizing the native reply from a home screen this is invisible entirely, making a potential reply to an unwanted user possible or facilitating a message in a reply with individuals missing from the conversation. Security issues often arise when texting confidential information to make sure such information is not shared with a member no longer in the group. These systems also often require that each member of the group know the identity by at least the phone number of every other member in the group. No levels of logging or delivery confirmation beyond a screenshot of a phone screen are available making traditional text messaging the most efficient method of communicating, but one that is not usable in an environment that requires structure, reliability and security.

Another typical group text messaging system involves a user that sends the same message to more than one recipient and hides each recipient's information from all recipients. In this instance, each recipient is unable to send a text message to the group or any member thereof, as all group member information is kept hidden from each member. Although each member can respond to the initial user's text message, these systems are designed in a one-to-many model that is not useable in bidirectional communications.

BRIEF SUMMARY OF THE INVENTION

It is an object of the present invention to provide an improved bidirectional group texting messaging system.

It is a related object of the present invention to provide an improved bidirectional group text messaging system that more easily facilitates one or more members of the group joining or leaving the group without the need to other members to know the status or identification of each group member.

Another object of the present invention is to provide an improved bidirectional group text messaging system such that each member of the group does not need to know the identity of all other members of the group.

In accordance with a preferred embodiment of the present invention, an improved bidirectional group texting messaging system comprises a group owner that initiates a group by obtaining a provisioned telephone number, the group owner establishes a list of group members using identifying information for each group member; and text messages from any group member are sent to the provisioned telephone number and from that provisioned telephone number sent to each group member; wherein the group members' identifying information is not available to any other group member except the group owner.

In accordance with another preferred embodiment of the present invention, a bidirectional group text messaging system comprises three or more group members, each having a device that can send or receive text messages, one or more provisioned phone numbers and a list of group members using identifying information for each group member, whereby text messages from any group member are sent to the provisioned telephone number and from that provisioned telephone number sent to each group member such that the group members' identifying information is not available to any other group member except the group owner.

Other objects and advantages will become apparent from the following descriptions, taken in connection with the accompanying drawings, wherein, by way of illustration and example, embodiments of the present invention are disclosed.

BRIEF DESCRIPTION OF THE FIGURES

The novel features believed to be characteristic of the invention are set forth in the appended claims and claims yet to be filed. However, the invention itself, as well as a preferred mode of use and further objectives and advantages thereof, will best be understood by reference to the following detailed description when read in conjunction with the accompanying Figures wherein:

DETAILED DESCRIPTION OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
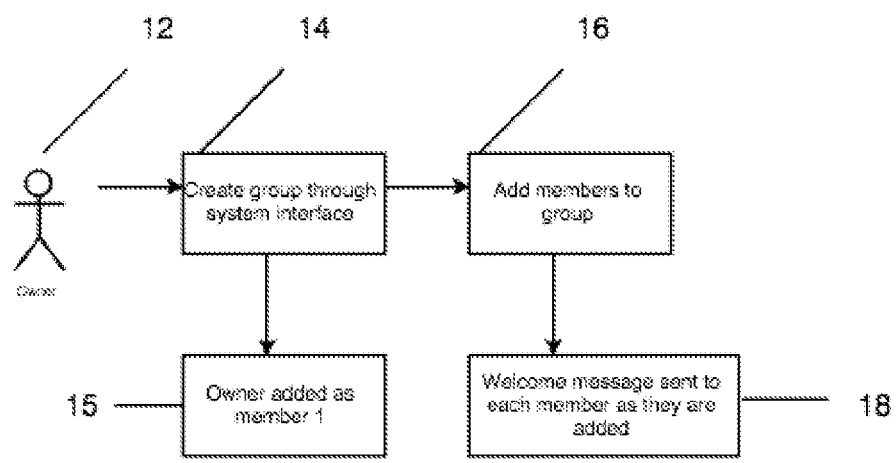
FIG. 1 is a flowchart showing the process of creating a group in the improved bidirectional group texting messaging system in accordance with a preferred embodiment of the present invention.

Turning first to FIG. 1, there is shown a flowchart of the improved bidirectional group texting messaging system in accordance with a preferred embodiment of the present invention. In the illustrated embodiment, group owner 12 is the group member responsible for establishing the initial members of a group, as well as any additions or deletions of members to the group after initialization, wherein each group member has a device and a specific identification information to allow the device to receive/transmit text messages. Initialization of the group by group owner 12 includes establishing the members of the group where each member's contact information including each members' phone number or other device specific information that allows receipt or transmittal of a text message. In the preferred embodiment, group owner 12 will employ an interface 14. This may be web-oriented, mobile application, desktop plugin, desktop client or third party application interfacing through an Application Programmable Interface (API). Group owner 12 will enter each group member's device identification information. At this initialization stage, group owner 12 will provision one or more virtual phone numbers. For the following example, a single provisioned phone number will be used to describe the system and method, and all group members will have identification information for the same country, and the United States will be used.

By adding members to the group either at creation time 16, or later, group owner 12 will initiate an automated process that will in practice, send an initial text message 18, to each member of the group, welcoming the members. Group owner 12 is identified as member number 1 in the illustrated embodiment at 15, though other practices may be employed. The text message being sent may also be referred to as the source text message, and the member from which the text message is sent may be referred to as the member sourcing the text message. Other information may also be included in initial text message 18, such as how the procedure for viewing all other member aliases in the group or control codes for things like removal or other administrative requests. The phone number provisioned by group owner 12 will carry with it necessary information so that any text message received at that provisioned number will be re-transmitted to each member of the group. Each member of the group will receive a text message from the provisioned phone number. In this way, each member will not know all members of the group, nor will each member have the identifying information of other members of the group. Accordingly, improved security will result. Of course, group owner 12 will have the group members' information.

Because group owner 12 may also add or delete one or more members at any time, security is also enhanced in that potentially confidential information is not inadvertently shared with a member that should no longer be in the group even though not all members need be aware of when a member enters or leaves the group.

Figure 2:
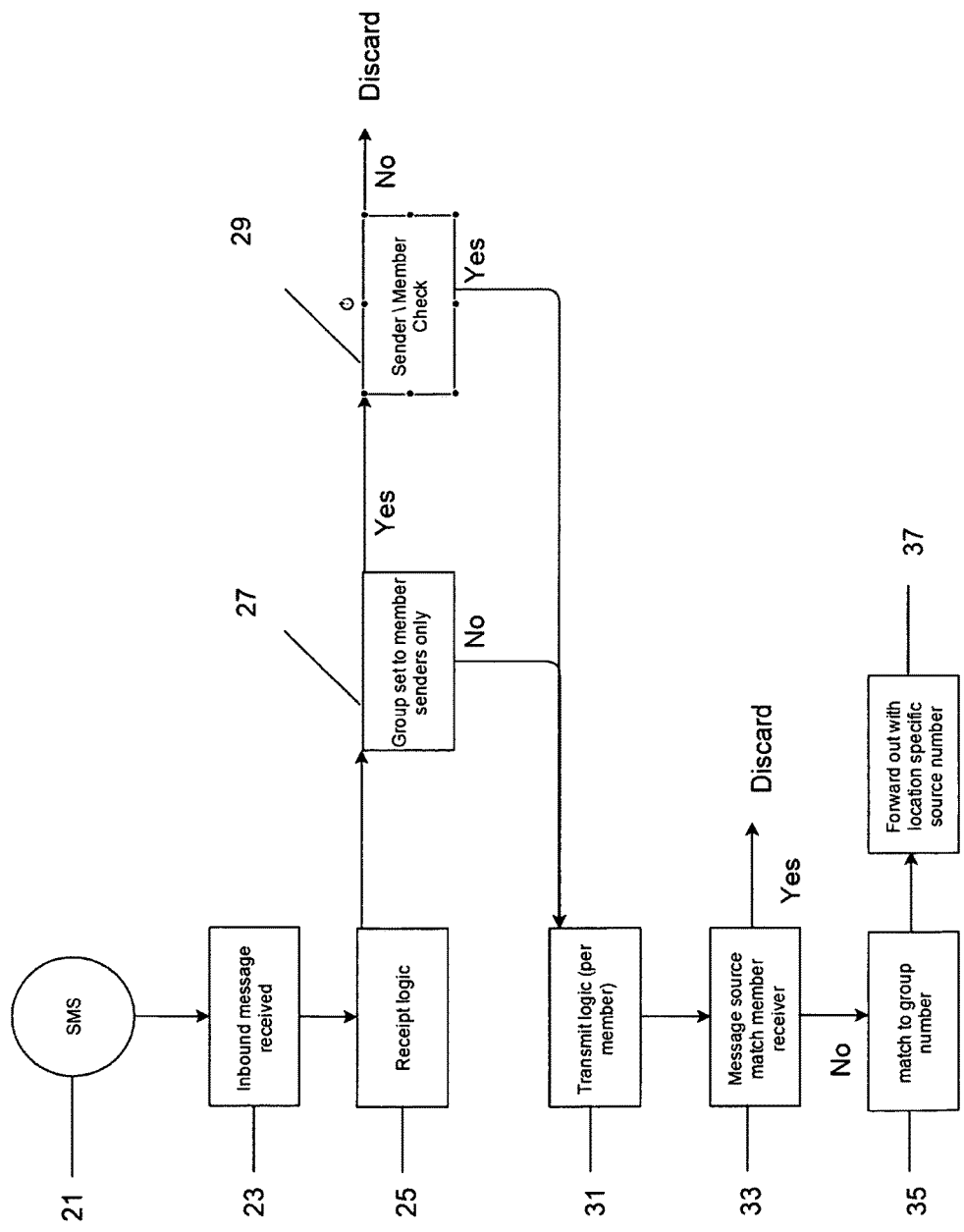
FIG. 2 is a flowchart showing the process of forwarding a message in accordance with a preferred embodiment of the present invention.

Turning next to FIG. 2, there is shown a flowchart illustrating message forwarding as in the preferred embodiment of the invention. Each group member may respond to a received text message as it will appear from the provisioned number rather than the number of the original or source sender. The responsive text message 21 will then be sent to the provisioned phone number at step 23, which in turn, will re-transmit the text message to each group member at steps 25-37, described in more detail below. Alternately, each group member may send a text message 21 to the provisioned phone number 23, i.e., not as a responsive text message. Again, the text message 21 received at the provisioned phone number 23 will re-transmit the text message to each member of the group 37.

It will be appreciated that a group member may receive their own text message. Alternately, logic may be employed whereby the identifying member information of the member sending the text message may be checked against the set of members receiving the text message and in the event the sending member is the same as one receiving member, that particular text message may be not sent to the member sourcing the text message 33. This is best thought of as echo elimination, as the sender already has record of the message in the chat log of their device.

Because a provisioned phone number is often a valid phone number for a minimum specified time period, e.g., a month, but may be renewed, groups established in the present invention may be established and exist for a short period of time, or may be extended as needed. In addition, because group owner 12 may add and delete members, in the illustrated embodiment, one group may be established with a provisioned phone number, and at a later time, substantially all the group members may be deleted, and a substantially different group member population may be established, thereby having two or more successive groups on the same provisioned phone number within the minimal time the provisioned phone number exists, thereby reducing costs for multiple, successive text messaging groups.

The present invention may also be employed with group members from more than one country. In such a situation, additional fees apply in sending text messages. Alternately, a separate phone number may be provisioned in one or more additional countries in which group members will receive or send text messages. In such a case, the system can detect from and to which members' device the text message is to be sent or received and rout the text message through the least expensive path. Additional provisioned phone numbers may also be used in a group. One example includes a provisioned phone number for each of a set number of group members, such as a separate number for every five group members. In such a situation, logic will detect the sourcing member and retransmit to the appropriate provisioned phone number or numbers to then re-transmit to each group member.

In the preferred embodiment, there is also a billing member. The billing member may also be a group member, but mostly for the purpose of maintaining costing and billing management. For example, for each text message received by the provisioned phone number to be re-transmitted to the group members, a value may be assigned based on the length of the text message, and any translation services, as well as the number and location of group members. This information may be maintained and a value billed to a customer for whom the bidirectional group text messaging system was established. Alternate ways of accounting for the system use may be employed. Examples include those based on number of times used, number of members in a group or length of time the group is active.

In the preferred embodiment, the system will maintain a message log file that may provide message details useful to the group owner. These system logs may contain message content and delivery information that may include time, date, deliver, and read confirmation information.

In the preferred embodiment, the system may offer language translation services if configured. Members may be set with languages differing from the default. When these are set, the system may be configured to translate transparently and bidirectional per member. In practice in the illustrated embodiment, group owner 12 upon entering a member to the group 16, may identify a language of preference to receive text messages. If a text message is sourced in a language other than the member's preferred language, upon receipt, and before re-transmitting from the pun phone number, the text message may be translated into the group member's preferred language by any number of available translation programs.

Figure 3:
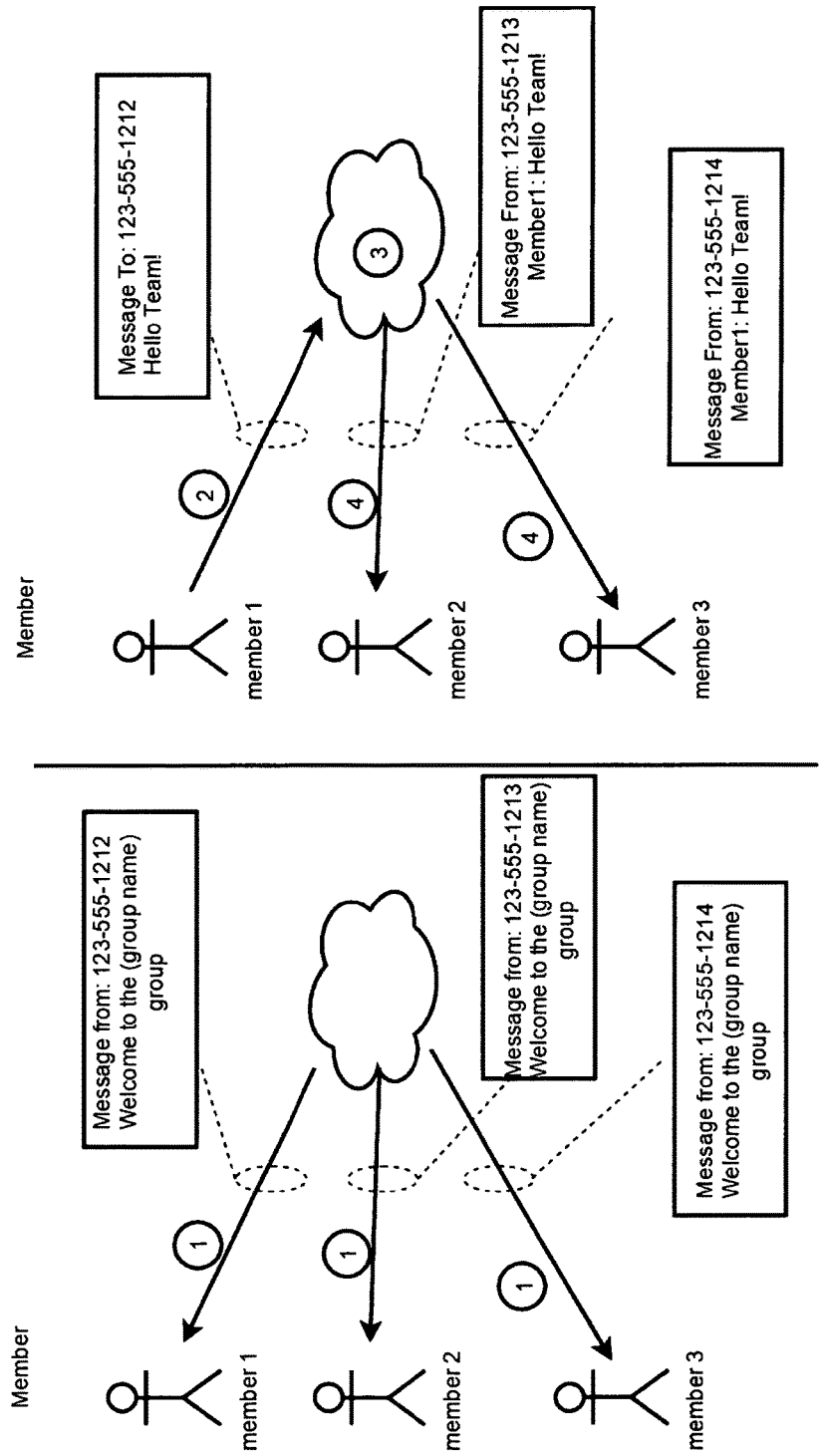
FIG. 3 is a flowchart showing the operation and member experience of the improved bidirectional group texting messaging system in accordance with a preferred embodiment of the present invention.

Turning next to FIG. 3, there is shown a representation of group member operational experience as described above. It will be appreciated that the system and method described herein may be useful on a variety of devices and platforms including, but not limited to, cell phones such as those using the iPhone or Android operating systems, mobile web devices, web GUIs, Outlook plugins, and API to third party applications. It will also be appreciated that the illustrated embodiment may be applied to both text messages including characters, and also text messages including images. Further, as is well known in the field, the text message or SMS message is converted to TCPIP for purposes of transmitting and receiving.

In an alternate embodiment of the present invention, external senders, i.e., those not a member of the group, will not be permitted on the system. For those that want to participate, they would need to be a group member, but marked 'silent' without permission to send a text message to the group.

To facilitate a fastest delivery of SMS messages, each member of a group will be provisioned a unique number within the group. These numbers may be used repeatedly in other groups and will use a matching algorithm to detect the identity of the sender and incoming number to know who is sending and to what group. These numbers will be reused, but never reissued to the same specific user, regardless of how many groups of which they re a member.

In this example a member group is created on the system, which causes the system to provision multiple numbers from the carrier and assign them, one to each. When a member sends a message, the incoming device number and provisioned number combination identify to the system what groups is to receive the message.

Once a group member is assigned a provisioned number it remains sticky to that user even if they have been deleted from a group. Should the user be recreated at a later date they will received the previously assigned number. In the illustrated embodiment, no user will receive a group number already assigned to themselves should they be added to another group. In this exemplar embodiment, unique device and provisioned number combination must exist for all users system wide.

Figure 4:
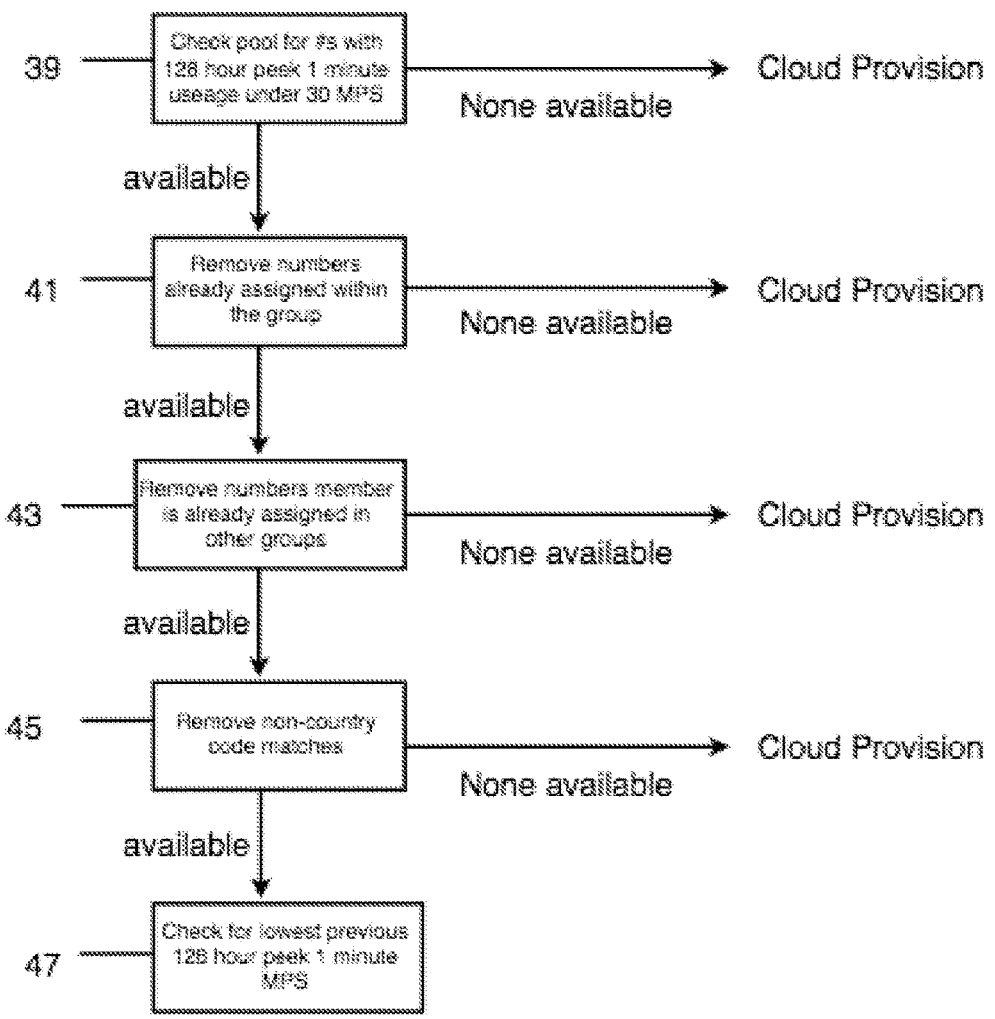
FIG. 4 is a flow chart showing provisioning of numbers according to an alternate embodiment of the present invention.

As shown in FIG. 4, the system will look to reuse numbers available in the system before requesting the provisioning of a new number from the carrier cloud. Assigned provisioned numbers will be monitored for usage activity as a determining factor for provisioning. The provisioned number, rather than a group's activity, is monitored for this determination. The system will keep a running monitor for each number for the previous 128 hours, for example, at step 39. If the peak number of messages for a number exceeds 30 messages in a 60 second interval, the number will not be provision-able at that time. The system will also test to remove numbers already assigned within the group at step 41, remove numbers of members already assigned in other groups at step 43, remove non-county code matches at step 45, and check for lowest previous 128 hour peek 1 minute usage at step 47, in determining the appropriate number to provision.

While the invention has been described in connection with preferred embodiments, it is not intended to limit the scope of the invention to the particular forms set forth, but on the contrary, it is intended to cover such alternatives, modifications, and equivalents as may be included within the spirit and scope of the invention as defined by the appended claims, and claims that may issue.

What is claimed:

1. A bidirectional group text messaging system comprising:
   a. a group owner that initiates a group by obtaining a provisioned telephone number for each member of the group, the group owner establishes a list of group members using identifying information for each group member;
   b. text messages from any group member are sent to the member's provisioned telephone number and from that provisioned telephone number sent to each group member;
   wherein the group members' identifying information is not available to any other group member except the group owner.

2. A bidirectional group text messaging system as claimed in claim 1 wherein the group owner may add and delete members at any time.

3. A bidirectional group text messaging system as claimed in claim 1 wherein the one or more provisioned phone numbers includes a provisioned phone number for a preset number of group members.

4. A bidirectional group text messaging system as claimed in claim 1 wherein a text message sourced from a group member is not sent to the sourcing member.

5. A bidirectional group text messaging system as claimed in claim 1 further comprising:
   a billing member that receives each sent message and calculates a value prior to the message being transmitted to each group member.

6. A bidirectional group text messaging system as claimed in claim 1 further comprising:
   a logging solution capable of logging message content, delivery verification and read verification.

7. A bidirectional group text messaging system as claimed in claim 1 further comprising:
   a translation solution capable of transparently converting between languages to enable group members to seamlessly communicate in their preferred languages simultaneously.

8. A bidirectional group text messaging system as claimed in claim 1 further comprising:
   a security system capable of removing external sending or receiving parties from communications based on a configured rule set.

9. A bidirectional group text messaging system comprising:
   a. three or more group members, each having a device that can send or receive text messages;
   b. one provisioned phone number for each member; and
   c. a list of group members using identifying information for each group member;
   d. whereby text messages from any group member are sent to the member's provisioned telephone number and from that provisioned telephone number sent to each group member such that the group members' identifying information is not available to any other group member except the group owner.

10. A bidirectional group text messaging system as claimed in claim 9 further comprising:
    a group owner that may add and delete members at any time.

11. A bidirectional group text messaging system as claimed in claim 9 wherein the one or more provisioned phone numbers includes a provisioned phone number for a preset number of group members.

12. A bidirectional group text messaging system as claimed in claim 9 wherein a text message sourced from a group member is not sent to the sourcing member.

13. A bidirectional group text messaging system as claimed in claim 9 further comprising:

a billing member that receives each sent message and calculates a value prior to the message being transmitted to each group member.

14. A bidirectional group text messaging system as claimed in claim 9 further comprising:
a logging solution capable of logging message content, delivery verification and read verification.

15. A bidirectional group text messaging system as claimed in claim 9 further comprising:
a translation solution capable of transparently converting between languages to enable group members to seamlessly communicate in their preferred languages simultaneously.

16. A bidirectional group text messaging system as claimed in claim 9 further comprising:
a security system capable of removing external sending or receiving parties from communications based on a configured rule set.

* * * * *